(12) United States Patent
Gilbertson et al.

(10) Patent No.: US 7,380,293 B2
(45) Date of Patent: Jun. 3, 2008

(54) SAFETY VALVE FOR TOILET TANK

(75) Inventors: Terry Steven Brent Gilbertson, Winnipeg (CA); Robert P. Amborsky, Winnipeg (CA)

(73) Assignee: S. B. Design Technology, Winnipeg, Manitoba (CA)

( * ) Notice: Subject to any disclaimer, the term of this patent is extended or adjusted under 35 U.S.C. 154(b) by 266 days.

(21) Appl. No.: 11/390,422

(22) Filed: Mar. 28, 2006

(65) Prior Publication Data
US 2007/0235087 A1 Oct. 11, 2007

(51) Int. Cl.
*F16K 17/22* (2006.01)
(52) U.S. Cl. ............................. 4/415; 137/462; 251/15; 251/16; 251/24
(58) Field of Classification Search ..................... 4/415; 137/460, 462, 501, 502, 503; 251/15, 16, 251/24
See application file for complete search history.

(56) References Cited

U.S. PATENT DOCUMENTS

| | | | | |
|---|---|---|---|---|
| 3,850,199 A | * | 11/1974 | Stone et al. | ................ 137/460 |
| 4,004,607 A | * | 1/1977 | Freese | ........................ 137/502 |
| 4,250,915 A | * | 2/1981 | Rikuta | ........................ 137/503 |
| 4,498,203 A | | 2/1985 | Barnum et al. | |
| 4,522,229 A | * | 6/1985 | Van de Moortele | ......... 137/460 |
| 4,694,852 A | * | 9/1987 | Grant | .......................... 137/501 |
| 4,964,421 A | * | 10/1990 | Klaus | .......................... 137/460 |
| 5,408,705 A | * | 4/1995 | Wodeslavsky | ................. 4/415 |
| 5,752,547 A | | 5/1998 | Rosenberg | |
| 6,961,966 B2 | | 11/2005 | Butsch et al. | |

FOREIGN PATENT DOCUMENTS

CA 2319370 8/1999

* cited by examiner

*Primary Examiner*—Stephen M Hepperle
(74) *Attorney, Agent, or Firm*—Adrian D. Battison; Michael R. Williams; Ryan W. Dupuis

(57) ABSTRACT

A filling system for a toilet tank prevents continual flow to the tank in the event of a leak from the tank by providing a hydraulically actuated safety valve for halting water flow to the filling valve in the event that the water flow continues for a time longer than an expected time of filling. The safety valve has a valve member connected to a piston mounted in a cylinder defining a first chamber on one side of the piston and a second chamber on the other side. A venturi in the supply duct provides in a low pressure chamber of the venturi a water pressure lower than the supply pipe pressure such that a pressure difference across the piston caused by the difference in pressure between the supply pressure and the low pressure chamber causes the piston to move from the first end toward the second end. A flow control orifice regulates a rate of flow of water such that a time of movement of the piston is greater than an expected time required to fill the toilet tank. A spring biases the piston to return the piston to the first end after the toilet tank is filled.

20 Claims, 2 Drawing Sheets

SAFETY VALVE FOR TOILET TANK

This invention relates to a hydraulically actuated safety valve which prevents continual flow to the tank in the event of a leak from the tank.

BACKGROUND OF THE INVENTION

Standard porcelain toilet tanks may develop leaks due to improper float arm levels, worn ball cocks, corroded flappers or worn or deteriorated tank to bowl gaskets. Porcelain tanks may also crack or fracture due to defects, over tightened tank bolts, fatigue, vibrations or temperature changes. Such a crack can result in flooding of the premises with consequential damage significantly greater than the cost of the damage to the toilet.

It is known therefore to provide devices which time a period of flow of water to a device and shut off the flow when the flow continues after a required period of time.

Such a situation may occur in the event that the tank cracks. More commonly such an event occurs when the flapper valve leaks or sticks open. While the second event may not be catastrophic, if not properly monitored can lead to significant excess water usage.

A device of this type is particularly important in rental accommodations where the occupants may be less attentive to the operation of and costs associated with the devices in the accommodations and may therefore leave a toilet tank filling continuously, provided it operates when required.

A number of devices have been previously provided but many of these require a supply of electricity either from a main supply or a battery supply to provide actuation of electrical components such as timers and solenoid valves. Such devices are of course undesirable and it is much more suitable for an arrangement of this type to be operated solely by the hydraulic pressure and action of the water passing through the valve.

SUMMARY OF THE INVENTION

It is one object of the invention to provide a hydraulically actuated safety valve which prevents continual flow to the tank in the event of a leak from the tank by halting water flow to the filling valve in the event that the water flow continues for a time longer than an expected time of filling.

According to one aspect of the invention there is provided a safety valve for halting water flow to a filling valve of a toilet tank in the event of failure, the valve comprising:

a valve body;

an inlet connector in the valve body for inlet of water from a water supply pipe at a supply pipe pressure;

an outlet connector in the valve body for connection to a filling line of a toilet tank;

a water supply duct within the valve body for passage of water from the inlet connector to the outlet connector;

a valve seat in the supply duct;

a valve member for movable between a closed position against the valve seat to prevent flow of the water from the inlet connector to the outlet connector and an open position spaced from the valve seat to allow flow;

a piston connected to the valve member for moving the valve member;

the piston being mounted in a cylinder in the valve body having a first chamber on one side of the piston and a second chamber on the other side of the piston;

the piston being movable within the cylinder from a first end in which the valve member is open to a second end in which the valve member is closed;

a venturi in the supply duct in the valve body through which the water flows as it passes from the inlet connector to the outlet connector having an orifice arranged so as to provide in a low pressure chamber of the venturi a water pressure lower than the supply pipe pressure;

a first transfer duct in the valve body for transferring water at the supply pipe pressure from the water supply duct to the first end of the cylinder;

a second transfer duct in the valve body for connecting second end of the cylinder to the low pressure chamber;

such that a pressure difference across the piston caused by the difference in pressure between the supply pressure and the low pressure chamber causes the piston to move from the first end toward the second end;

a flow control orifice in one of the first and second transfer ducts for regulating a rate of flow of water therethrough such that a time of movement of the piston from the first end to the second end in which the valve member is closed is greater than an expected time required to fill the toilet tank;

and a spring biasing the piston to the first end for returning the piston to the first end after the toilet tank is filled, when there is no pressure difference across the piston;

whereby, in the event that the tank is filled and the filling valve closed before the valve member is closed by the movement of the piston, the piston is moved back to the first end;

and whereby, in the event the filling valve remains open for a time longer than said time of movement, the valve member contacts the valve seat by the movement of the piston to prevent further supply of water to the filling valve.

Preferably the flow control orifice is adjustable to vary the time of movement.

Preferably there is provided a reset transfer duct having a reset valve which is manually operable for transferring water under supply pressure to the second side of the piston to reset the piston at the first end, in the event that the valve member is closed by the movement of the piston to prevent further supply of water to the filling valve.

Preferably there is provided by-pass duct with a one-way valve for bypassing the flow control orifice to allow passage of water at a rate greater than the rate through the flow control orifice so as to cause the piston to return to the first end at a rate faster than the movement to the second end.

Preferably there is provided a low flow venturi having a second orifice which is smaller than the orifice of said venturi such that the low flow venturi provides in a low pressure chamber of the low flow venturi a water pressure lower than the supply pipe pressure when there is a low flow of water through the water supply duct caused by a slow leakage of the filling valve, the low pressure chamber of the low flow venturi being connected to the second end of the cylinder.

Preferably the low pressure chambers of the first and second venturis are connected in series and there is a back check valve between the first venturi and the second venturi.

Preferably the piston has a piston rod passing through a chamber to which the first and second venturis are attached and wherein the piston rod is arranged to close off the connection to the first venturi before closing the valve member on the valve seat.

Preferably there is provided a check valve arranged to keep the first larger venturi closed at low pressure until the pressure, due to the restriction through the low flow venturi, exceeds a predetermined value indicative of the filling valve of the toilet being approximately 50% to 100% open.

Preferably the flow control orifice is in the second transfer duct. Although it may also be located in the first transfer duct provided it controls the rate of flow of water so as to cause the piston to move only slowly to the close position.

The valve member may be directly attached to a piston rod of the piston and particularly may be located on an end of the piston rod so as to move axially with the piston rod onto the valve seat.

Preferably the piston rod passes through the second end of the cylinder and the spring is mounted in the second end of the cylinder.

Preferably the venturi is downstream of the valve seat.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
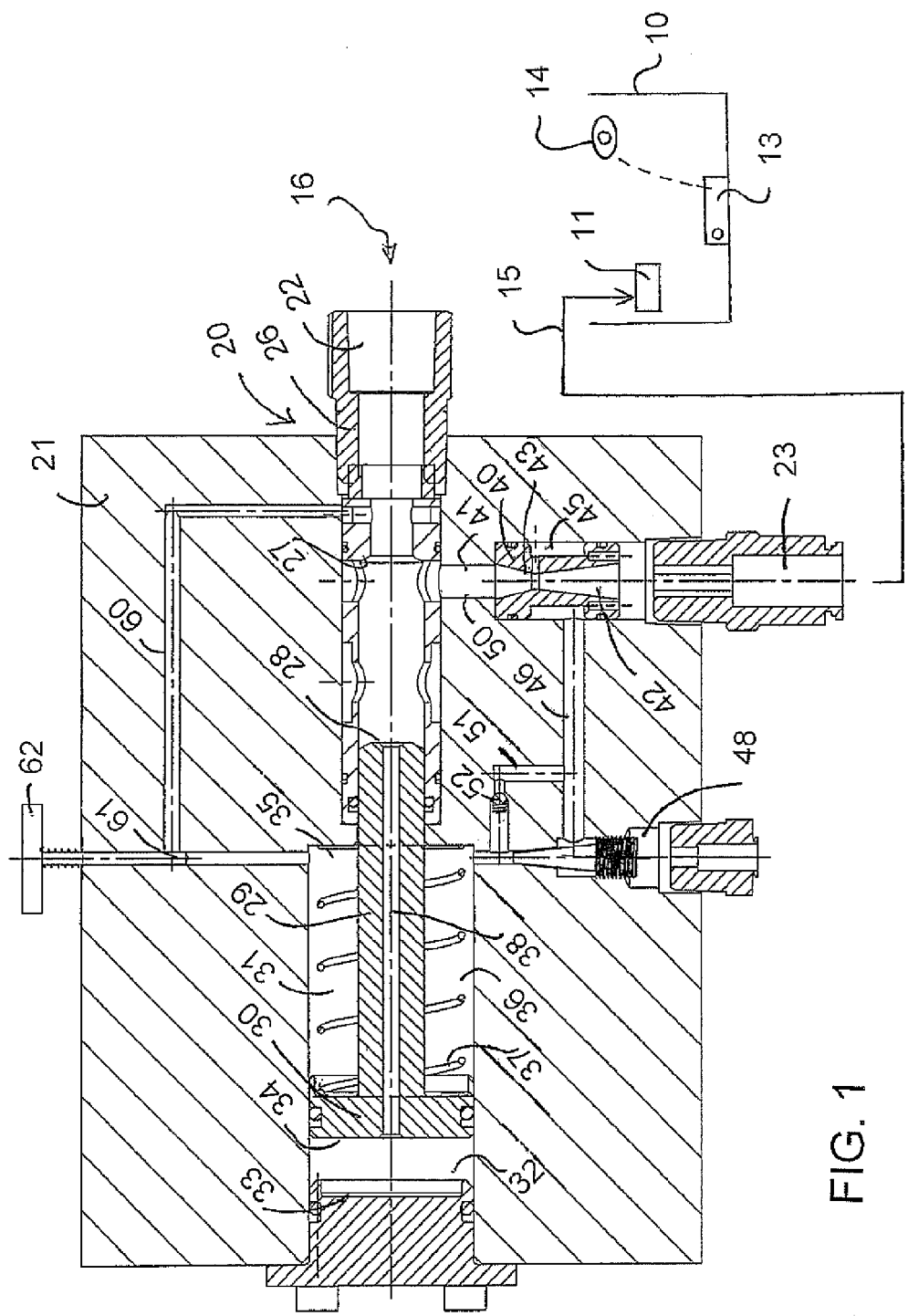
FIG. 1 is a schematic illustration of a safety valve for cooperation with a filling valve of a toilet tank.

In FIG. 1 is shown a toilet tank 10 having a filling valve 11 operated by a float 12. The tank has a flapper valve 13 actuated by a flush control 14. Thus in conventional manner when the flush control 14 is actuated, the flapper valve is opened allowing the water from the tank to flow into to the toilet. The flapper valve is intended to close after the tank is emptied and the fall of the float within the tank as the water is discharged opens the filling valve 11 to allow the supply of water from a filling line or supply pipe 15 into the filling valve to fill the tank. A safety valve 20 is provided which operates to halt flow of water to the filling valve in the event that the filling valve remains open for a period of time which is longer than that which is expected for the normal filling of the tank. The filling valve may remain open in the event that it becomes jammed or in the event that the flapper fails to close or in the event that the tank cracks so that the contents are discharged onto the floor around the toilet rather than into the toilet. In any of these events it is of course highly desirable that the flow to the toilet tank be halted to prevent excess usage of water and to prevent the possibility that the water is discharged into the premises with consequential significant damage.

The safety valve 20 comprises a valve housing 21. The valve housing 21 has a first connector 22 for attachment to the supply pipe. The connector is of a conventional nature using conventional plumbing fittings. The housing further has a second connector 23 for connection to a filling line 15 supplying the filling valve.

The housing is preferably designed to be of a sufficiently small size but it can be located in the area of the toilet tank between the supply pipe and to the inlet at the bottom of the tank. Thus the device can be quickly and rapidly attached using the existing or conventional fittings which provide a filler line which extends generally from the floor to the bottom of the tank. In this case the supply pipe 15 is preferably provided at the bottom of the housing 20 and the outlet 23 is preferably provided at the top for connection into the bottom of the tank.

The connector 22 supplies the water from the supply pipe into a duct 26 within which is mounted a valve seat 27. A valve closure member 28 is provided which can be pushed axially of the duct 26 into engagement with the valve seat 27 to cause closure of the valve. Thus when the valve member 28 is moved into the valve seat, flow through the duct 26 is halted and the supply through the valve to the outlet 23 is closed off thus preventing further flow of any water from the pipe into the tank.

The valve member 28 is mounted on the end of a piston rod 29 attached to a piston 30. The piston 30 is mounted within a cylinder 31 which provides therefore a first side 32 of the cylinder at a first end 33. Thus pressure within the first side 32 is applied against one end face 34 of the piston. The cylinder provides a second end 35 defining a second side of the piston chamber 36. Thus the cylinder defines two chambers 32 and 36 each on a respective side of the piston so that the piston is moved along the cylinder in response to a differential in pressure between the chambers 32 and 36. A spring 37 is provided in the second chamber 36 so as to apply additional force against the piston from the side of the chamber 36. A duct 38 communicates from the duct 26 through the piston rod 29 to the first chamber 32. Thus pressure from the supply pressure at the inlet 15 is communicated through the duct 26 and the duct 38 to the first chamber 32.

A venturi 40 is provided in a duct 41 communicating from the duct 26 downstream of the valve seat 27 to the outlet 23. The venturi 40 has a passage 42 with an orifice 43 so that at the orifice is generated an area of low pressure. The area of low pressure at the orifice is communicated to a low pressure chamber 45 of the venturi. Depending on the size of the orifice 43 in the passage of the venturi, water will flow through the venturi at a predetermined rate for supply to the outlet 23. The size of the orifice is determined so that it does not significantly increase the period of time for filling the tank. At the same time the orifice is chosen in size so that it generates within the chamber 45 a low pressure which is significantly less than the supply pressure at the inlet 15. Such a low pressure may be of the order of 10% of the inlet pressure but can be significantly higher depending upon the selection of the dimensions of the piston, the piston rod and the spring 37.

The low pressure chamber 45 connects through a transfer duct 46 to the second chamber 36. Within the transfer duct 46 is provided a flow control orifice 47 defined by a needle valve 48. The needle valve 48 is adjustable to control the size of the orifice 47 and thus to control the rate of flow of water through the transfer duct 46.

In an initial position of operation of the device with the filling valve 11 closed, the piston 30 is located at the left hand end of the cylinder facing the chamber 32.

In the event that the filling valve is opened, water flows past the valve seat 27 since the valve is opened by the position of the piston 30 at the left hand end of the cylinder. Water thus flows into the duct 41 and passes to the outlet 23 to provide filling to the tank. The water passing through the duct 41 flows through the venturi 40 thus providing a reduction in the pressure in the low pressure chamber 45.

As the low pressure chamber 45 is connected to the chamber 36 of the cylinder, water can flow from the chamber 36 into the low pressure chamber 45 where it passes through the orifice of the venturi joining the flow through the duct 41 and passes into the outlet 23. This flow of water from the chamber 36 of the cylinder allows the pressure in the chamber 32 to cause the piston to move toward the right. The rate of movement of the piston is controlled by the needle valve 48 and its orifice 47. The needle valve 48 is adjusted so that the time of movement of the piston before it reaches the valve seat 27 is longer than the expected time for filling of the tank.

In the event that the tank is filled and the filling tank 11 closed before the valve member 28 reaches the seat 27, flow is halted through the venturi 40 by the closing of the filling valve 11. In this situation the pressure in the low pressure chamber 45 increases back to inlet pressure so as to increase the pressure in the chamber 36 of the cylinder. Thus the chambers 32 and 36 are at the same pressure so that the movement of the piston is controlled by the application of force by the spring 37.

Thus when the filling valve 11 is closed, the system moves back to the initial position by the force from the spring 37 moving the piston 30 toward the left. This rate of movement can be increased by providing a valve 52 in a bypass 51 bypassing the orifice 47. In this way the flow through the transfer duct 46 to the chamber 36 can occur more quickly than it would if it passes through the orifice 47 thus allowing the piston 30 to move more rapidly toward the left.

Thus it will be appreciated that the duct 38 through the piston rod forms a first transfer duct allowing water to enter the chamber 32 and to depart from the chamber 32 as required. Symmetrically the duct 46 forms a second transfer duct communicating with the chamber 36 of the cylinder.

In the event that a fault in the filling system means that the tank does not fill in the expected time so that the valve 11 remains open, the piston 30 continues to move toward the right until the valve member 28 meets the valve seat 27. In this position the water flow is closed so that no more water flows through either of the transfer ducts 38 or 46 and the piston 30 applies force against the valve seat 27.

The piston 30 holds the valve member 28 against the valve seat 27 and the valve thus remains closed while pressure continues to be called for at the inlet 15.

A reset duct 60 is provided which communicates from the duct 26 upstream of the valve seat 27 to the chamber 36 of the cylinder. This duct 60 remains normally closed by a valve 61. However the valve 61 can be operated by a manual reset pull button 62. In the event therefore that the valve is closed due to a malfunction of the filling system, it remains closed until it is reopened by manual actuation of the reset button 62 which allows transfer of water from the inlet to the chamber 36 causing the piston to move toward the left. The reset button is held for a sufficient period of time to allow the water flow through the duct 60 into the chamber 36 and through the duct 38 from the chamber 32 to occur sufficiently to allow the piston to move to its initial position at the left hand end of the cylinder.

Of course it is expected that the reset button will only be depressed in the event that the fault causing the original failure of the filling valve 11 has been resolved.

In the event that the tank has cracked allowing the water to discharge from the tank, of course it will be necessary for the tank to be replaced. In the event that the flapper valve has become stuck so that the tank continues to discharge into the toilet, return of the flapper valve to its closed position will allow the tank to refill after the reset button has been pressed. Repeated sticking of the flapper valve will of course be noted by the occupant or user of the toilet in that it will be necessary to repeatedly reset the valve 20 indicating that the flapper valve is continually sticking open.

Figure 2:
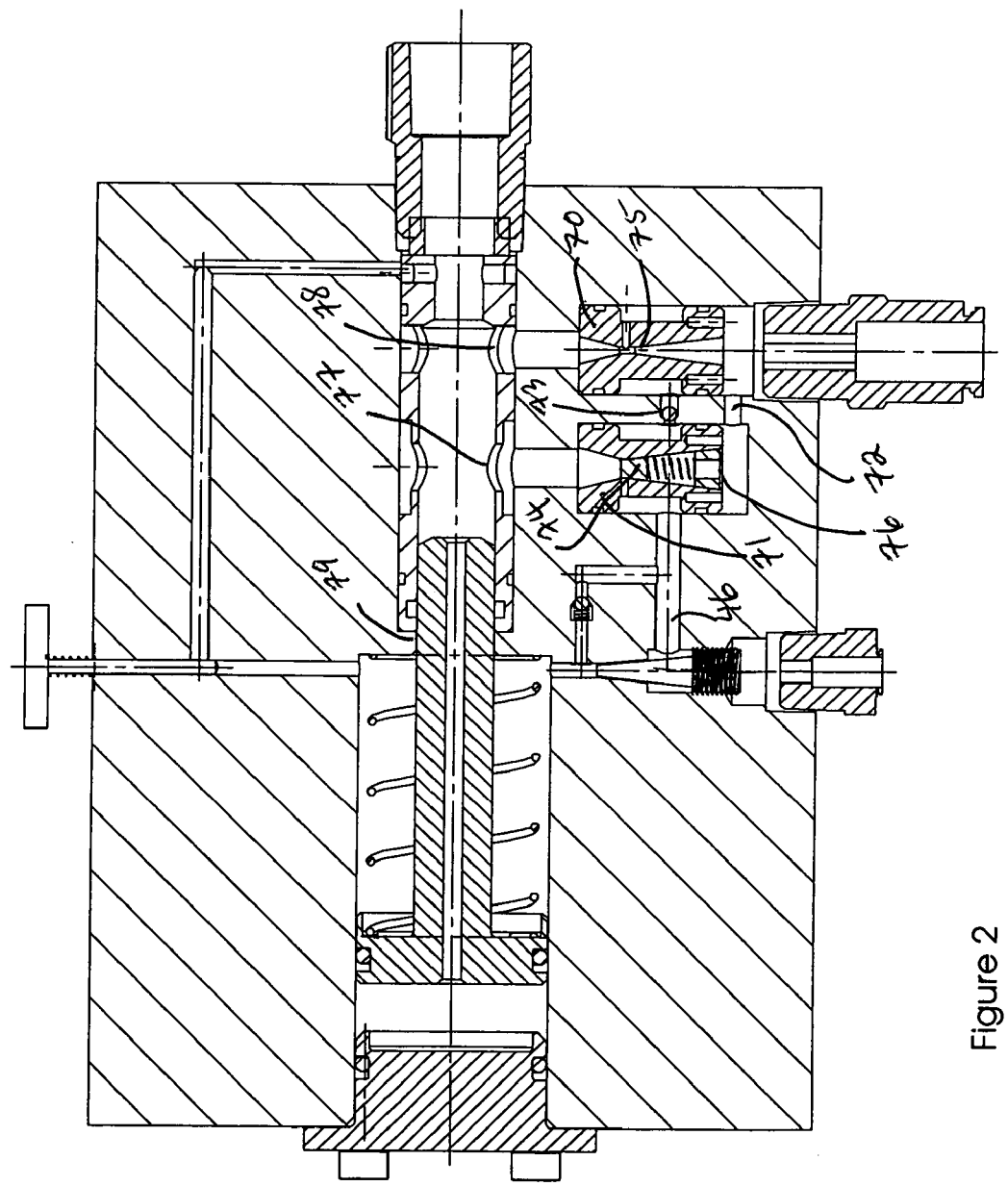
FIG. 2 is a schematic illustration of a second embodiment which utilizes a second venturi for monitoring low flow leaks.

In the embodiment shown in FIG. 2 there is added a second venturi which allows monitoring of low flow leaks through the filler valve 11. This may occur due to low flow leaks past the flapper valve or due to slight overflowing of the tank into the overflow. The second venturi has a smaller orifice so that it allows only a relatively small amount of flow through the venturi while at the same time generating the low pressure chamber.

The arrangement as shown in FIG. 2 is substantially identical to that as shown in FIG. 1 so that that the identical components are described herein and have the same function and arrangement as previously described. Thus in place of the single venturi arrangement 40 of FIG. 1 there is provided two separate venturis 70 and 71. Each of these connects to the duct 79 downstream of the inlet and in advance of the valve member on the end of the piston. Thus the venturi 70 is fed by a duct communicating from the cylindrical duct 79 at a mouth 78 and similarly the venture 71 is fed from a duct communicating at mouth 77. It will be noted that the mouth 77 is closer to the piston 30 and the valve member 28 and thus is closed off when the piston 30 and its piston rod 29 move toward the right.

The venturi 70 has a smaller orifice 75 than the orifice 76 of the venturi 71. Thus the venturi 71 constitutes a high flow venturi which allows through a higher level of fluid while generating the necessary low pressure within the venturi chamber. The venturi 71 is thus intended to take the majority of the flow since a smaller venturi such as that venturi 70 may generate cavitation in the area just downstream of the venturi orifice which can rapidly cause wear within and down stream from the safety valve.

In order that the flow passes through the low flow venturi 70 during low flow conditions, the larger venturi 71 has a check valve 76 which is spring actuated into a closed position. The valve is downstream of the venturi orifice and is pushed opened against the spring in the event that high flow conditions occur. The high flow conditions occur in the event that the filling valve 11 opens so that there is a significant pressure drop between the inlet 22 and outlet 23 due to the valve 11 being approx 50 to 100% opened. When this large pressure drop occurs greater than a predetermined set value of the valve 76, flow through the venturi 71 occurs at the high flow rate which acts to fill the tank relatively quickly due to the high flow and also avoids cavitation in the low flow venturi 70. However in the event that the valve 11 is only slightly open due to a leak, low flow conditions occur leading to a low pressure drop between the inlet 22 and the outlet 23 so that the valve 76 remains closed and all of the flow passes through the venturi 70. The orifice 75 of the venturi 70 is smaller than the orifice 74 of the venturi 71. In this way the necessary pressure drop occurs in the venturi 70 allowing the device to operate in the same manner as previously described so that the piston 30 moves toward the right at a rate of movement controlled by the valve 48. If the movement occurs over a period of time which is sufficient to allow the piston to reach the right hand end, the valve member 28 closes against a valve seat 27 thus closing off the valve as previously described.

Thus in low flow conditions the venturi 70 controls the operation of the device and allows it to close off the filling, if the low flow filling continues over a time period longer than an allowable time period.

During normal filling operations, the high flow rate opens the valve 76 causing the high flow to pass through the venturi 71 which then flows through the duct 72 into the outlet 23. When the valve member 28 passes over the port 77 the high flow rate venturi 71 is closed off and the further filling continues only through the low flow venturi 70.

A back check valve 73 is provided in a duct communicating between the chambers of the venturi 70 and 71. The back check valve 73 prevents the water from flowing from the chamber of the venturi 70 to the chamber of the venturi 71. This acts to prevent low pressure in the chamber of the venturi 71 from being filled with water drawn from the venturi 70.

The piston can have an o-ring seal or a bellows type seal, the later having less friction then the O-ring and allows for the miniaturization of the device. We will probably go this way.

The venturi can be replaced with an orifice plate; a plate with a small hole placed in it. Duct 46 would intersect duct 41 just down stream of the orifice plate and a similar pressure drop would occur. An orifice plate may be a more cost effect method of achieving the same thing.

The device could work on a hot water tank as well. The device could be set up to close at a time just greater then say a bath filling or one shower. With hot water tank failure you always get a tank load of water on the floor.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A safety valve for halting water flow to a filling valve of a toilet tank in the event of failure, the valve comprising:
   a valve body;
   an inlet connector in the valve body for inlet of water from a water supply pipe at a supply pipe pressure;
   an outlet connector in the valve body for connection to a filling line of a toilet tank;
   a water supply duct within the valve body for passage of water from the inlet connector to the outlet connector;
   a valve seat in the supply duct;
   a valve member for movable between a closed position against the valve seat to prevent flow of the water from the inlet connector to the outlet connector and an open position spaced from the valve seat to allow flow;
   a piston connected to the valve member for moving the valve member;
   the piston being mounted in a cylinder in the valve body having a first chamber on one side of the piston and a second chamber on the other side of the piston;
   the piston being movable within the cylinder from a first end in which the valve member is open to a second end in which the valve member is closed;
   a pressure reduction orifice in the supply duct in the valve body through which the water flows as it passes from the inlet connector to the outlet connector having an orifice arranged so as to provide in a low pressure chamber of the pressure reduction orifice a water pressure lower than the supply pipe pressure;
   a first transfer duct in the valve body for transferring water at the supply pipe pressure from the water supply duct to the first end of the cylinder;
   a second transfer duct in the valve body for connecting second end of the cylinder to the low pressure chamber;
   such that a pressure difference across the piston caused by the difference in pressure between the supply pressure and the low pressure chamber causes the piston to move from the first end toward the second end;
   a flow control orifice in one of the first and second transfer ducts for regulating a rate of flow of water therethrough such that a time of movement of the piston from the first end to the second end in which the valve member is closed is greater than an expected time required to fill the toilet tank;
   and a spring biasing the piston to the first end for returning the piston to the first end after the toilet tank is filled, when there is no pressure difference across the piston;
   whereby, in the event that the tank is filled and the filling valve closed before the valve member is closed by the movement of the piston, the piston is moved back to the first end;
   and whereby, in the event the filling valve remains open for a time longer than said time of movement, the valve member is closed by the movement of the piston to prevent further supply of water to the filling valve.

2. The safety valve according to claim 1 wherein the flow control orifice is adjustable to vary the time of movement.

3. The safety valve according to claim 1 wherein there is provided a reset transfer duct having a reset valve which is manually operable for transferring water under supply pressure to the second side of the piston to reset the piston at the first end, in the event that the valve member is closed by the movement of the piston to prevent further supply of water to the filling valve.

4. The safety valve according to claim 1 wherein there is provided a by-pass duct with a one-way valve for by-passing the flow control orifice to allow passage of water at a rate greater than the rate through the flow control orifice so as to cause the piston to return to the first end at a rate faster than the movement to the second end.

5. The safety valve according to claim 1 wherein the flow control orifice is in the second transfer duct.

6. The safety valve according to claim 1 wherein the valve member is attached to a piston rod of the piston.

7. The safety valve according to claim 1 wherein the valve member is located on an end of the piston rod and moves axially with the piston rod onto the valve seat.

8. The safety valve according to claim 7 wherein the piston rod passes through the second end of the cylinder.

9. The safety valve according to claim 1 wherein the spring is mounted in the second end of the cylinder.

10. The safety valve according to claim 1 wherein the pressure reduction orifice is a venturi which is downstream of the valve seat.

11. The safety valve according to claim 1 wherein there is provided a second pressure reduction orifice for low flow which is smaller than the pressure reduction orifice such that the second orifice provides in a low pressure chamber of the low flow orifice a water pressure lower than the supply pipe pressure when there is a low flow of water through the water supply duct caused by a slow leakage of the filling valve, the low pressure chamber of the low flow orifice being connected to the second end of the cylinder.

12. The safety valve according to claim 11 wherein the low pressure chambers of the first and second orifices are connected in series and there is a back check valve between the first orifice and the second orifice.

13. The safety valve according to claim 11 wherein the piston has a piston rod passing through a chamber to which the first and second orifices are attached and wherein the piston rod is arranged to close off the connection to the first orifice before closing the valve member on the valve seat.

14. The safety valve according to claim 11 wherein there is provided a check valve arranged to keep the first larger orifice closed at low pressure until the pressure exceeds a predetermined value indicative of the filling valve of the toilet being fully open.

15. Apparatus comprising:
a toilet tank;
a filling valve for connection to a water supply pipe for supplying filling water to the tank at a supply pipe pressure;
the filling valve having a filling valve member and an actuator responsive to a level of water in the toilet tank for opening the filling valve member when the tank is below a filled level and for closing the filling valve member when the tank is at the filled level;
and a safety valve for halting water flow to the filling valve in the event that the water flow continues for a time longer than an expected time of filling;
the safety valve comprising:
  a valve body;
  an inlet connector in the valve body for connection to the water supply pipe;
  an outlet connector in the valve body for connection to the filling valve;
  a water supply duct within the valve body for passage of water from the inlet connector to the outlet connector;
  a valve seat in the supply duct;
  a valve member for movable between a closed position against the valve seat to prevent flow of the water from the inlet connector to the outlet connector and an open position spaced from the valve seat to allow flow;
  a piston connected to the valve member for moving the valve member;
  the piston being mounted in a cylinder in the valve body having a first chamber on one side of the piston and a second chamber on the other side of the piston;
  the piston being movable within the cylinder from a first end in which the valve member is open to a second end in which the valve member is closed;
  a pressure reduction orifice in the supply duct in the valve body through which the water flows as it passes from the inlet connector to the outlet connector having an orifice arranged so as to provide in a low pressure chamber of the pressure reduction orifice a water pressure lower than the supply pipe pressure;
  a first transfer duct in the valve body for transferring water at the supply pipe pressure from the water supply duct to the first end of the cylinder;
  a second transfer duct in the valve body for connecting second end of the cylinder to the low pressure chamber;
  such that a pressure difference across the piston caused by the difference in pressure between the supply pressure and the low pressure chamber causes the piston to move from the first end toward the second end;
  a flow control orifice in one of the first and second transfer ducts for regulating a rate of flow of water therethrough such that a time of movement of the piston from the first end to the second end in which the valve member is closed is greater than an expected time required to fill the toilet tank;
  and a spring biasing the piston to the first end for returning the piston to the first end after the toilet tank is filled, when there is no pressure difference across the piston;
  whereby, in the event that the tank is filled and the filling valve member is closed before the valve member is closed by the movement of the piston, the piston is moved back to the first end;
  and whereby, in the event the filling valve member remains open for a time longer than said time of movement, the valve member is closed by the movement of the piston to prevent further supply of water to the filling valve.

16. The apparatus according to claim 15 wherein there is provided a reset transfer duct having a reset valve which is manually operable for transferring water under supply pressure to the second side of the piston to reset the piston at the first end, in the event that the valve member is closed by the movement of the piston to prevent further supply of water to the filling valve.

17. The apparatus according to claim 15 wherein there is provided a by-pass duct with a one-way valve for by-passing the flow control orifice to allow passage of water at a rate greater than the rate through the flow control orifice so as to cause the piston to return to the first end at a rate faster than the movement to the second end.

18. The apparatus according to claim 15 wherein there is provided a low flow pressure reduction orifice having a second orifice which is smaller than the pressure reduction orifice such that the low flow pressure reduction orifice provides in a low pressure chamber of the low flow pressure reduction orifice a water pressure lower than the supply pipe pressure when there is a low flow of water through the water supply duct caused by a slow leakage of the filling valve, the low pressure chamber of the low flow pressure reduction orifice being connected to the second end of the cylinder.

19. The apparatus according to claim 15 wherein the flow control orifice is in the second transfer duct.

20. The apparatus according to claim 15 wherein the valve member is attached to a piston rod of the piston.

* * * * *